(12) United States Patent
Kimura et al.

(10) Patent No.: US 8,623,987 B2
(45) Date of Patent: Jan. 7, 2014

(54) ROOM TEMPERATURE FAST-CURING ORGANOPOLYSILOXANE COMPOSITION AND ITS CURING METHOD

(75) Inventors: Tsuneo Kimura, Annaka (JP); Takafumi Sakamoto, Annaka (JP); Mamoru Teshigawara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 157 days.

(21) Appl. No.: 13/237,160

(22) Filed: Sep. 20, 2011

(65) Prior Publication Data

US 2012/0010349 A1    Jan. 12, 2012

Related U.S. Application Data

(62) Division of application No. 12/100,976, filed on Apr. 10, 2008, now Pat. No. 8,123,897.

(30) Foreign Application Priority Data

Apr. 12, 2007    (JP) ................................. 2007-104478

(51) Int. Cl.
C08L 83/04    (2006.01)

(52) U.S. Cl.
USPC .................................. 528/34; 528/17; 528/21

(58) Field of Classification Search
None
See application file for complete search history.

(56) References Cited

U.S. PATENT DOCUMENTS

| | | | |
|---|---|---|---|
| 3,408,325 A | 10/1968 | Hittmair et al. | |
| 4,536,540 A * | 8/1985 | Dziark | 524/701 |
| 4,721,765 A | 1/1988 | Inoue et al. | |
| 5,319,050 A | 6/1994 | Kimura et al. | |
| 5,424,383 A | 6/1995 | Kimura et al. | |
| 5,482,992 A | 1/1996 | Kimura et al. | |
| 5,739,248 A | 4/1998 | Hoheneder et al. | |
| 5,969,075 A | 10/1999 | Inoue | |
| 6,395,855 B1 | 5/2002 | Luft et al. | |
| 6,593,413 B2 | 7/2003 | Muramatsu et al. | |
| 6,710,119 B2 | 3/2004 | Kimura et al. | |
| 2007/0088123 A1* | 4/2007 | Futatsumori et al. | 524/863 |
| 2008/0312369 A1 | 12/2008 | Beers et al. | |
| 2010/0006224 A1 | 1/2010 | Levandoski et al. | |

FOREIGN PATENT DOCUMENTS

| | | |
|---|---|---|
| EP | 0 657 517 A1 | 6/1995 |
| EP | 1 273 618 A1 | 1/2003 |
| JP | 121188 A | 5/1991 |
| JP | 2811134 B2 | 10/1993 |
| JP | 2841155 B2 | 3/1995 |
| JP | 11-80550 A | 3/1999 |
| JP | 2000-129130 A | 5/2000 |
| JP | 2002-12767 A | 1/2002 |
| JP | 2002-338811 A | 11/2002 |

* cited by examiner

Primary Examiner — Marc Zimmer
(74) Attorney, Agent, or Firm — Birch, Stewart, Kolasch & Birch, LLP

(57) ABSTRACT

A room temperature fast-curing organopolysiloxane composition which has excellent fast curability as well as deep curability is provided without using an organic compound having C=O group and the organic compound having $NH_2$ group which are the volatile components. A method for curing such composition is also provided. The room temperature fast-curing organopolysiloxane composition comprises: (A) 100 parts by weight of a diorganopolysiloxane having both ends terminated with hydroxy group and/or a hydrolyzable group; (B) 0.5 to 10 parts by weight of a silane and/or a siloxane having at least 3 alkenoxysilyl groups in its molecule and being capable of forming a compound having $—NH_2$ group by hydrolysis; (C) 0.5 to 10 parts by weight of a silane and/or a siloxane having at least 3 aminosilyl groups in its molecule and being capable of forming a compound having $—NH_2$ group by hydrolysis; and (D) 0.01 to 10 parts by weight of a curing catalyst.

4 Claims, No Drawings

ROOM TEMPERATURE FAST-CURING ORGANOPOLYSILOXANE COMPOSITION AND ITS CURING METHOD

CROSS-REFERENCE TO RELATED APPLICATION

This application is a divisional of application Ser. No. 12/100,976 filed on Apr. 10, 2008 now U.S. Pat. No. 8,123,897 which claims priority under 35 U.S.C. §119(a) on Patent Application No. 2007-104478 filed in Japan on Apr. 12, 2007, the entire contents of each of which are hereby incorporated by reference.

TECHNICAL FIELD

This invention relates to a room temperature fast-curing organopolysiloxane composition which is adapted for uses as a silicone sealant, an adhesive, a coating agent, or a potting agent, and more specifically, to a room temperature fast-curing organopolysiloxane composition which cures by condensation and which has excellent fast curability as well as excellent deep curability. This invention also relates to a method for curing such room temperature fast-curing organopolysiloxane composition.

BACKGROUND ART

Conventional condensation-curable room temperature fast-curing organopolysiloxane compositions include one part-type compositions in which amount of the crosslinking agent has been reduced to the minimum level to thereby increase the crosslinking speed, and the two part-type compositions in which the crosslinking agent and the curing agent have been separately packaged. However, the one part-type composition does not really have a fast curability since it only exhibits high curing speed on its surface, and a considerable time is required for the in depth curing. The two part-type composition, on the other hand, has the drawback of poor handling convenience since the two parts cannot be mixed at a ratio of 1:1, and it is not adapted for use in an automatic mixer despite its relatively high in depth curability. Furthermore, in order to accomplish complete curing to the full depth, a strict control in the amount of the crosslinking agent and the curing agent added, or alternatively, an addition of water as an in depth curing agent was necessary. In the meanwhile, an addition curable organopolysiloxane composition requires a heated furnace for its curing although it has improved workability since the two parts can be mixed at a ratio of 1:1. The addition curable organopolysiloxane composition also has the drawback that the working conditions are limited since the curing catalyst is poisoned in the presence of an addition poison.

Generation of water in the composition system is effective in solving such problems. Japanese Patent No. 2811134 (Patent Document 1) proposes use of the water generated as a side product in the course of ketimine formation between an organic compound having at least one C=O group in its molecule and an organic compound having at least one $NH_2$ group in its molecule for the depth curing agent. Japanese Patent No. 2841155 (Patent Document 2) proposes use of water generated as a side product in the course of ketimine formation between the ketone compound generated from an alkenoxysilane and a primary amine compound for the in depth curing agent. Japanese Patent No. 3121188 (Patent Document 3) proposes use of water generated as a side product in the course of Michael addition between a β keto ester compound and an organic compound having at least one $NH_2$ group in one molecule for the depth curing agent. However, in order to supply the water at an amount sufficient for the crosslinking reaction, volatile components such as the organic compound having C=O group and the organic compound having $NH_2$ group, the alkenoxysilane and the primary amine compound, the β keto ester and the organic compound having $NH_2$ group should be added at a large amount. Use of the methods requiring such addition of volatile components at a large amount will be gradually limited in consideration of the increasingly severe regulations of environmental load substances such as sick house regulations and VOC regulations.

Japanese Patent Application Laid-Open No. 2002-338811 (Patent Document 4) proposes use of the water generated in the course of neutralization between a carboxylic acid generated by hydrolysis of a hydrolyzable silane having at least two acyloxy groups in its molecule or its partial hydrolysate and an inorganic filler for the in depth curing agent. However, such curable composition generating a carboxylic acid which generates a carboxylic acid has extremely limited applications because of the metal corrosion problem.

Japanese Patent Application Laid-Open No. 2002-12767 (Patent Document 5) proposes direct supply of the moisture by incorporating a moisture-containing wet silica in the composition, and use of the thus supplied moisture for the in depth curing agent. However, control of the curing reaction is difficult when the moisture is directly supplied, and workability is hardly realized.

Japanese Patent Application Laid-Open No. 2000-129130 corresponding to U.S. Pat. No. 5,969,075 (Patent Document 6) discloses a room temperature-curable organopolysiloxane composition comprising an amino group-containing silane and 1-methylvinyloxy group-containing silane, and having a good flowability. However, the amino group-containing silane used in the composition does not form a compound having —$NH_2$ group when hydrolyzed. This does not make the composition fast-curing.

DISCLOSURE OF THE INVENTION

The present invention has been accomplished in view of the situation as described above, and an object of the present invention is to provide a room temperature fast-curing organopolysiloxane composition which has excellent fast curability as well as deep curability even if an organic compound having C=O group and the organic compound having $NH_2$ group which are the volatile components are not used. Another object of the present invention is to provide a method for curing such a composition.

In order to realize the objects as described above, the inventors of the present invention have made a further study to use the water which has generated in the course of ketimine formation as a side product for an in depth curing agent. More specifically, instead of using an organic compound having C=O group and an organic compound having $NH_2$ group, the inventors tried to use an organic compound having C=O group and an organic compound having $NH_2$ group that had resulted in the course of crosslinking of the crosslinking agent for the in depth curing agent. After extensive study of various types of crosslinking agents and catalyst species, the inventors found that a room temperature fast-curing organopolysiloxane composition comprising (A) a diorganopolysiloxane having both ends terminated with hydroxy group and/or a hydrolyzable group, (B) a silane and/or a siloxane having at least 3 alkenoxysilyl groups in its molecule, (C) a silane and/or a siloxane having at least 3 aminosilyl groups in its molecule and being capable of forming a compound having —NH$_2$ group by hydrolysis, and (D) a curing catalyst has sufficient fast curability as well as excellent in depth curability. The present invention has been accomplished on the bases of such findings.

Accordingly, the present invention provides a room temperature fast-curing organopolysiloxane composition comprising (A) 100 parts by weight of a diorganopolysiloxane having both ends terminated with hydroxy group and/or a hydrolyzable group, (B) 0.5 to 10 parts by weight of a silane and/or a siloxane having at least 3 alkenoxysilyl groups in its molecule, (C) 0.5 to 10 parts by weight of a silane and/or a siloxane having at least 3 aminosilyl groups in its molecule and being capable of forming a compound having —NH$_2$ group by hydrolysis, and (D) 0.01 to 10 parts by weight of a curing catalyst.

In this case, it is preferred that the room temperature fast-curing organopolysiloxane composition is formulated as a two part composition comprising a first part composition containing the components (A), (B), and (D), and a second part composition containing the components (A), (C), and optionally (D).

More preferably, the present invention provides a room temperature fast-curing organopolysiloxane composition consisting of a first part composition and a second part composition, said first part composition comprising (A) 10 to 90 parts by weight of a diorganopolysiloxane having both ends terminated with hydroxy group and/or a hydrolyzable group, (B) 0.5 to 10 parts by weight of a silane and/or a siloxane having at least 3 alkenoxy silyl groups in its molecule, and (D) 0.01 to 10 parts by weight of a curing catalyst, and said second part composition comprising (A) 10 to 90 parts by weight of a diorganopolysiloxane having both ends terminated with hydroxy group and/or a hydrolyzable group, (C) 0.5 to 10 parts by weight of a silane and/or a siloxane having at least 3 aminosilyl groups in its molecule being capable of forming a compound having —NH$_2$ group by hydrolysis, and (D) 0 to 9.99 parts by weight of a curing catalyst, with the proviso that the total amount of component (A) contained in the first and second part compositions is 100 parts by weight and the total amount of component (D) contained in the first and second part compositions is 0.01 to 10 parts by weight.

The present invention also provides a method for curing such room temperature fast-curing organopolysiloxane composition comprising the steps of coating a substrate with the first part composition containing the components (A), (B), and (D); coating another substrate with the second part composition containing the components (A), (C), and optionally (D); and bonding the substrates by bringing the first part composition with the second part composition for curing.

EFFECTS OF THE INVENTION

The room temperature fast-curing organopolysiloxane composition of the present invention has excellent fast curability and in depth curability, and therefore, this product is well adapted for use as a sealant, an adhesive, a coating agent, or a potting agent.

DESCRIPTION OF THE PREFERRED EMBODIMENTS

Next, the present invention is described in further detail.
Component (A)

The diorganopolysiloxane having both ends terminated with hydroxy group and/or a hydrolyzable group (component (A)) is typically the one represented by the following general formula:

HO—(R$_2$SiO)$_n$—H

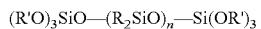

(R'O)$_3$SiO—(R$_2$SiO)$_n$—Si(OR')$_3$

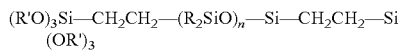

(R'O)$_3$Si—CH$_2$CH$_2$—(R$_2$SiO)$_n$—Si—CH$_2$CH$_2$—Si(OR')$_3$ wherein R is independently a substituted or unsubstituted monovalent hydrocarbon group, n is an integer of at least 10, and R' is a monovalent hydrocarbon group containing up to 6 carbon atoms or an alkoxyalkyl group.

In this general formula, R is independently an optionally substituted monovalent hydrocarbon group which is typically an alkyl group containing 1 to 20 carbon atoms, an alkenyl group containing 2 to 20 carbon atoms, an aryl group containing 6 to 20 carbon atoms, or a substituent which is any one of such monovalent hydrocarbon group having at least one of its hydrogen atoms substituted with a halogen atom such as fluorine. Exemplary alkyl groups include methyl group, ethyl group, propyl group, and cyclohexyl group, and exemplary alkenyl groups include vinyl group and allyl group. Exemplary aryl groups include phenyl group, and exemplary halogen-substituted groups include 3,3,3-trifluoropropyl group. Among these, the preferred are methyl group, vinyl group, and phenyl group, and the most preferred is methyl group.

R' is a monovalent hydrocarbon group containing 1 to 6 carbon atoms or an alkoxyalkyl group containing 2 to 6 carbon atoms, and the monovalent hydrocarbon group may be the one containing 1 to 6 carbon atoms among those mentioned for the R. Exemplary alkoxyalkyl groups include methoxymethyl group, ethoxymethyl group, propoxymethyl group, butoxymethyl group, pentyloxymethyl group, methoxyethyl group, ethoxyethyl group, propoxyethyl group, butoxyethyl group, methoxypropyl group, ethoxypropyl group, propoxypropyl group, methoxybutyl group, ethoxybutyl group, and methoxypentyl group. Among these, the preferred are methyl group, methoxymethyl group, and methoxyethyl group.

In the general formula, n is an integer of at least 10 which is selected so that the diorganopolysiloxane has a viscosity at 25° C. of preferably 10 to 1,000,000 mPa·s, more preferably 100 to 100,000 mPa·s, and most preferably 300 to 50,000 mPa·s. An excessively low viscosity may result in the insufficient mechanical properties of the cured product while an excessively high viscosity may result in the unduly increased viscosity of the composition, which in turn results in the loss of workability. In the present invention, viscosity is the value measured by a rotary viscometer.

Preferable examples of the component (A) include the compounds represented by the following formulae:

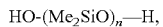

HO-(Me$_2$SiO)$_n$—H,

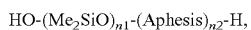

HO-(Me$_2$SiO)$_{n1}$-(Aphesis)$_{n2}$-H,

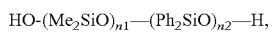

HO-(Me$_2$SiO)$_{n1}$—(Ph$_2$SiO)$_{n2}$—H,

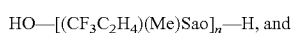

HO—[(CF$_3$C$_2$H$_4$)(Me)Sao]$_n$—H, and

HO-(Me$_2$SiO)$_{n1}$—[(CF$_3$C$_2$H$_4$)(Me)Sao]$_{n2}$—H wherein n is as defined above, $n_1$ and $n_2$ are respectively an integer of at least 1 satisfying $n_1+n_2=n$, Me is methyl group, and Ph is phenyl group.

Component (B)

The silane and/or the siloxane having at least 3 alkenoxy silyl groups in its molecule (component (B)) is the source of the crosslinking agent and the organic compound having C=O group, and it is preferably an alkenoxysilane represented by the following formula:

wherein $R^1$ and $R^2$ are independently a substituted or unsubstituted monovalent hydrocarbon group; $R^3$ and $R^4$ are independently hydrogen atom or a substituted or unsubstituted monovalent hydrocarbon group; with the proviso that $R^2$ and $R^3$ may together represent an alicyclic hydrocarbon group having the C=C double bond in the above formula with the carbon atoms having the $R^2$ and $R^3$ bonded thereto, x is 0 or 1; or its partial hydrolysate.

In this formula, $R^1$ and $R^2$ are respectively an optionally substituted monovalent hydrocarbon group preferably having 1 to 10 carbon atoms, and exemplary monovalent hydrocarbon groups include alkyl groups such as methyl group, ethyl group, propyl group, butyl group, and cyclohexyl group; alkenyl groups such as vinyl group and allyl group; aryl groups such as phenyl group; aralkyl groups such as benzyl group; and halogen-substituted alkyl groups such as 3,3,3-trifluoropropyl group. The most preferred are methyl group, ethyl group, vinyl group, and phenyl group.

$R^3$ and $R^4$ are independently hydrogen atom or an optionally substituted monovalent hydrocarbon group preferably having 1 to 10 carbon atoms, and exemplary monovalent hydrocarbon groups include alkyl groups such as methyl group, ethyl group, propyl group, isopropyl group, butyl group, and isobutyl group.

$R^2$ and $R^3$ may together represent an alicyclic hydrocarbon group having the C=C double bond in the above formula with the carbon atoms having the $R^2$ and $R^3$ bonded thereto. In this case, the above formula may be shown as follows:

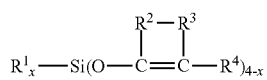

wherein $-R^2-R^3-$ is an alkylene group preferably having 3 or 4 carbon atoms (i.e., trimethylene group or tetramethylene group).

Most preferably, $R^3$ and $R^4$ are independently hydrogen atom, methyl group and ethyl group, and $-R^2-R^3-$ in which $R^2$ and $R^3$ are bonded together is $-(CH_2)_4-$ with the proviso that $R^4$ is hydrogen atom.

The crosslinking agent may be obtained, for example, by dehydrochlorination of the corresponding chlorosilane and the organic compound having C=O group. If desired, a scavenger for the hydrochloric acid such as triethylamine may be added to the reaction system.

The silane and/or the siloxane having at least 3 alkenoxy silyl groups (component (B)) may be incorporated at 0.5 to 10 parts by weight, and preferably at 1 to 8 parts by weight per 100 parts by weight of the diorganopolysiloxane (component (A)). Curability will be insufficient when incorporated at less than 0.5 parts by weight, while amount in excess of 10 parts by weight results in the loss of in depth curability, and hence in the reduced workability.

Component (C)

The silane and/or the siloxane having at least 3 aminosilyl groups in its molecule and being capable of forming a compound having $-NH_2$ group by hydrolysis (component (C)) is the source of the crosslinking agent and the organic compound having $NH_2$ group, and it is preferably an aminosilane represented by the following formula:

wherein $R^5$ is a substituted or unsubstituted monovalent hydrocarbon group; $R^6$ is a substituted or unsubstituted monovalent hydrocarbon group; and y is 0 or 1; or its partial hydrolysate.

In this formula, $R^5$ is an optionally substituted monovalent hydrocarbon group preferably having 1 to 10 carbon atoms, which may be an alkyl group such as methyl group, ethyl group, propyl group, butyl group, or cyclohexyl group; an alkenyl group such as vinyl group or allyl group; an aryl group such as phenyl group; an aralkyl group such as benzyl group; or a halogen-substituted alkyl group such as 3,3,3-trifluoropropyl group. The most preferred are methyl group, ethyl group, vinyl group, and phenyl group.

$R^6$ is an optionally substituted monovalent hydrocarbon group preferably having 1 to 10 carbon atoms, which may be an alkyl group such as methyl group, ethyl group, propyl group, butyl group, pentyl group, or cyclohexyl group; or an alkenyl group such as allyl group. The most preferred are ethyl group, propyl group, butyl group, pentyl group, and cyclohexyl group.

The crosslinking agent may be obtained, for example, by dehydrochlorination of the corresponding chlorosilane and the organic compound having $NH_2$ group. If desired, a scavenger for the hydrochloric acid such as triethylamine may be added to the reaction system.

The silane and/or the siloxane having at least 3 aminosilyl groups and being capable of forming a compound having $-NH_2$ group by hydrolysis (component (C)) may be incorporated at 0.5 to 10 parts by weight, and preferably at 1 to 8 parts by weight per 100 parts by weight of the diorganopolysiloxane (component (A)). Curability will be insufficient when incorporated at less than 0.5 parts by weight, while amount in excess of 10 parts by weight results in the loss of in depth curability, and hence in the reduced workability.

Component (D)

The curing catalyst (component (D)) is the component which functions in the composition of the present invention as a condensation catalyst between the component (A) and the component (B), and a condensation catalyst between the component (A) and the component (C). The condensation catalyst between the components (A) and (B) and the condensation catalyst between the components (A) and (C) may be either the same or different, and such catalyst may comprise a single catalyst or a mixture of two or more catalyst.

Examples of the component (D) include tin catalysts such as dibutyltinoctoate, dimethyltindiversatate, dibutyldimethoxytin, dibutyltindiacetate, dibutyltindioctoate, dibutyltindilaurate, dibutyltindibenzylmaleate, dioctyltindilaurate, and tin chelates; strong base compounds such as guanidine and DBU (1,8-diazabicyclo[5.4.0]-7-undecene); or an alkoxysilane having such group; titanate esters such as tetraisopropoxytitanium, tetra-n-butoxytitanium, tetrakis(2-ethylhexoxy)titanium, dipropoxybis(acetylacetate)titanium, and titaniumisopropoxyoctylene glycolate, and titanium chelate compounds.

The component (D) may be incorporated at 0.01 to 10 parts by weight, and preferably 0.02 to 5 parts by weight per 100 parts by weight of the diorganopolysiloxane (component (A)). Curability will be insufficient when incorporated at less than 0.01 parts by weight, while amount in excess of 10 parts by weight results in the loss of durability of the composition.

Component (E)

When the composition of the present invention requires tackiness, a silane coupling agent (E) may be incorporated as a tackifier component. The silane coupling agent used may be the one known in the art, and the preferred is the one having an alkoxysilyl group or up to two alkenoxysilyl groups as the hydrolyzable group in the molecule. Exemplary such silane coupling agents include vinyltris(β-methoxyethoxy)silane, methacryloxypropyltrimethoxysilane, β-(3,4-epoxycyclohexyl)ethyltrimethoxysilane, glycidoxypropyltrimethoxysilane, glycidoxypropylmethyldiethoxysilane, N-β-(aminoethyl)γ-aminopropyltrimethoxysilane, aminopropyltriethoxysilane, mercaptopropyltrimethoxysilane, glycidoxypropyltriisopropenoxysilane, and glycidoxypropylmethyldiisopropenoxysilane, and among these, the most preferred are aminosilane coupling agents.

When a silane coupling agent is incorporated, it may be incorporated at 0.1 to 10 parts by weight, and more preferably at 0.2 to 5 parts by weight per 100 parts by weight of the diorganopolysiloxane (component (A)). Tackiness may become insufficient when incorporated at less than 0.1 parts by weight, while amount in excess of 10 parts by weight may result in economic disadvantage.

Component (F)

The composition of the present invention may also have incorporated therein a filler (F) which functions as a reinforcing agent and an extender. Examples of the filler component (F) include reinforcement fillers such as fumed silica, wet silica, precipitated silica, and calcium carbonate; a metal oxides such as aluminum oxide and zinc oxide; a metal hydroxide, carbon black, glass beads, glass balloon, resin beads, and resin balloons. Among these, the preferred are fumed silica, precipitated silica, calcium carbonate, and zinc oxide. These fillers may be optionally treated by a known surface treating agent.

The filler component (F) is preferably incorporated in the composition of the present invention at an amount of 1 to 500 parts by weight, and in particular, at 2 to 250 parts by weight per 100 parts by weight of the diorganopolysiloxane (component (A)). The effect of adding this component may become insufficient when incorporated at less than 1 part by weight, while an amount in excess of 500 parts by weight may result in the loss of injection ability and workability of the present composition.

Other Components

In order to promote ketimine formation at the initial stage in the composition of the present invention, addition of an organic compound having C=O group or an organic compound having $NH_2$ group at a small amount is effective. Exemplary such compounds include acetone, methyl ethyl ketone, methyl isobutyl ketone, cyclohexanone, n-butylamine, n-octylamine, and cyclohexylamine.

When such an organic compound having C=O group or an organic compound having $NH_2$ group is added at a small amount, both of these compounds may be added at an amount of 0.1 to 10 parts by weight, and in particular, at 0.5 to 5 parts by weight per 100 parts by weight of the component (A).

In addition to the components as described above, the room temperature fast-curing organopolysiloxane composition may also contain additives known in the art at an amount that does not adversely affect the objects of the present invention. Exemplary such additives include a polyether as a thixotropic agent, a non-reactive dimethylsilicone oil or isoparaffin as a plasticizer, and a network polysiloxane polymer comprising trimethylsiloxy unit and $SiO_2$ unit as an agent for increasing the crosslinking degree.

If desired, the composition may also include a colorant such as a pigment, a dye, or a fluorescent brightening agent; a bioreactive additive such as a fungicide, an antibacterial agent, a cockroach repellent, or an antifouling agent; a bleed oil such as a non-reactive phenyl silicone oil or a fluorosilicone oil, a surface modifying agent which is incompatible with the silicone such as an organic fluid; a solvent such as toluene, xylene, solvent gasoline, cyclohexane, methylcyclohexane, or a low boiling isoparaffin.

Preparation and Curing of the Composition

The room temperature fast-curing organopolysiloxane composition of the present invention may be produced by homogeneously mixing the components (A) to (D), the optional components (E) and (F), and other components in a kneader of the type known in the art such as a planetary mixer.

The resulting composition is a one-part type composition and the amounts of the respective components are as defined above.

In this case, for convenient preparation of the composition, a first part composition comprising the components (A), (B), and (D), the optional components (E) and (F), and other optional components and a second part composition comprising the components (A) and (C), the optional components (D), (E) and (F), and other optional components may be separately prepared, and these first and second part compositions may be mixed with a static or dynamic mixer immediately before the use. Formulation in such two part composition facilitates a longer shelf life.

When the composition of the present invention is formulated in two parts as described above, the component (B) which generates the organic compound having C=O group by hydrolysis and the component (C) which generates the organic compound having $NH_2$ group by hydrolysis are preferably incorporated in different parts in view of storage stability of the resulting product.

When the composition is formulated in two part-type composition, it is preferred that the room temperature fast-curing organopolysiloxane composition consists of a first part composition and a second part composition, said first part composition comprising (A) 10 to 90 parts, preferably 30 to 70 parts, more preferably 40 to 60 parts by weight of a diorganopolysiloxane having both ends terminated with hydroxy group and/or a hydrolyzable group, (B) 0.5 to 10 parts by weight of a silane and/or a siloxane having at least 3 alkenoxy silyl groups in its molecule, and (D) 0.01 to 10 parts by weight of a curing catalyst, and said second part composition comprising (A) 10 to 90 parts, preferably 30 to 70 parts, more preferably 40 to 60 parts by weight of a diorganopolysiloxane having both ends terminated with hydroxy group and/or a hydrolyzable group, (C) 0.5 to 10 parts by weight of a silane and/or a siloxane having at least 3 aminosilyl groups in its molecule being capable of forming a compound having —$NH_2$ group by hydrolysis, and (D) 0 to 9.99 parts by weight of a curing catalyst, with the proviso that the total amount of component (A) contained in the first and second part compositions is 100 parts by weight and the total amount of component (D) contained in the first and second part compositions is 0.01 to 10 parts by weight.

With regard to the curing catalyst component (D), use of different curing catalysts respectively adapted for the components (B) and (C) is recommended, and in this case, each curing catalyst is preferably incorporated in the first part and the second part compositions, and more specifically, the curing catalyst adapted for the component (B) and the curing catalyst adapted for the component (C) may be incorporated either in the first or the second part composition.

When the curing catalyst adapted for the component (B) is incorporated in the first part composition, and the curing catalyst adapted for the component (C) is incorporated in the second part composition, both the first part and the second part compositions have excellent curability by themselves, and when they are combined, the resulting composition exhibits remarkable in depth curability. This formulation is excellent for the method in which the first part composition is coated on one substrate and the second part composition is coated on another substrate, and the substrates are bonded by bringing the first part composition with the second part composition for curing.

When the curing catalyst adapted for the component (C) is incorporated in the first part composition, and the curing catalyst adapted for the component (B) is incorporated in the second part compositions, each part composition will have a prolonged pot life, and this result in the improved handling convenience of the material. When these two part compositions are mixed, the mixture will exhibit curability and the in depth curability.

In this case, the curing catalyst (D) is exemplified above. Preferably, component (D) of the first part composition as a condensation catalyst for components (A) and (B) is guanidine, 1,8-diazabicyclo[5.4.0]-7-undecene or an alkoxysilane having a guanidyl group such as tetramethylguanidylpropyltrimethoxysilane. Component (D) of the second part composition as a condensation catalyst for components (A) and (C) is preferably a tin catalyst.

The amount of component (D) in the first and second part compositions is defined above. Preferably, when the curing catalyst adapted for the component (B) and the curing catalyst adapted for the component (C) are separately incorporated in the first part and the second part compositions as the component (D), both the curing catalyst adapted for the component (B) and the curing catalyst adapted for the component (C) may be used at a content of 0.01 to 9.99 parts by weight, especially 0.01 to 5 parts by weight per 100 parts by weight of the total amount of component (A) in the first and second part compositions. In this case, the total amount of component (D) contained in the first and second part compositions is preferably 0.02 to 10 parts by weight.

With respect to the organic compound having C=O group such as acetone, methyl ethyl ketone, methyl isobutyl ketone and cyclohexanone, and the organic compound having $NH_2$ group such as n-butylamine, n-octylamine and cyclohexylamine, addition of such compounds is recommended when the composition is formulated as a two part composition, and in such a case, the small amount of the organic compound having C=O group is preferably added to the part containing the component (B), and the small amount of the organic compound having $NH_2$ group is preferably added to the part containing the component (C).

When such an organic compound having C=O group or an organic compound having $NH_2$ group is added at a small amount, both of these compounds may be added at an amount of 0.1 to 10 parts by weight, and in particular, at 0.5 to 5 parts by weight per 100 parts by weight of the total amount of component (A) in the first and second part compositions.

Accordingly, the first part composition further comprises the organic compound having C=O group in an amount of 0.1 to 10 parts by weight, and the second part composition further comprises the organic compound having $NH_2$ group in an amount of 0.1 to 10 parts by weight.

The silane coupling agent (E) and the filler (F) may also be incorporated in the first part composition and/or the second part composition. In this case, the silane coupling agent (E) is incorporated in the first part composition and/or the second part composition in an amount of 0.1 to 10 parts by weight per 100 parts by weight of the total of components (A) in the first and second part compositions. The filler (F) is incorporated in the first part composition and/or the second part composition in an amount of 1 to 500 parts by weight per 100 parts by weight of the total of components (A) in the first and second part compositions.

The weight ratio of the first part composition and the second part composition is not particularly limited. However, the mixing ratio in terms of weight ratio is preferably in the range of 25:75 to 75:25, in particular, 40:60 to 60:40, and most preferably 50:50, and the components (A) and (D) may be added in the first and the second parts at an amount within such range, and more preferably, at an equal amount.

When the room temperature fast-curing organopolysiloxane composition of the present invention is prepared as a one part-type composition or prepared as a two part-type composition so that the first and second part compositions are separately prepared and mixed before using, the resulting composition is applied on a desired substrate and cured.

Alternatively, when the first and second part compositions are separately prepared, the room temperature rapid-curing organopolysiloxane composition of the present invention may be used by coating a substrate with the first part composition and another substrate with the second part composition, and thereafter bonding the substrates by bringing the first part composition with the second part composition for curing.

Curing may be conducted at a temperature of 0 to 150° C., especially 10 to 50° C., although curing is usually conducted at room temperature. Curing time is not particularly limited, although the curing is conducted for 10 minutes to 3 days.

Applications of the Composition

The room temperature fast-curing organopolysiloxane composition of the present invention is well adapted for use as a sealant, adhesive, coating agent, and potting agent.

EXAMPLES

Next, the present invention is described in further detail by referring to the following Examples and Comparative Examples which by no means limit the scope of the present invention. In the following Examples and Comparative Examples, viscosity is the value measured by a rotary viscometer at 25° C.

Example 1

As the first part composition, 50 parts by weight of dimethylpolysiloxane terminated at both ends with hydroxy group and having a viscosity of 5000 mPa·s, 2.5 parts by weight of vinyltriisopropenoxysilane, and 0.5 parts by weight of tetramethylguanidylpropyltrimethoxysilane were mixed until the mixture was homogeneous. Composition 1-1 was thereby produced.

As the second part composition, 50 parts by weight of dimethylpolysiloxane terminated at both ends with hydroxy group and having a viscosity of 5000 mPa·s, 2.5 parts by weight of methyl-tri-n-butylaminosilane, and 0.1 parts by weight of dioctyltindilaurate were mixed until the mixture was homogeneous. Composition 1-2 was thereby produced.

All of the composition 1-1 and all of the composition 1-2 were charged in a duplex cartridge of a 12-stage static mixer, and the mixture was injected from a purposely built gun to form a sheet having a thickness of 2 mm. The sheet was cured for 24 hours at a temperature of 23° C. and a relative humidity of 50%. The sheet was then evaluated for its physical properties.

Comparative Example 1

A sheet having a thickness of 2 mm was produced by using the composition 1-1, and the sheet was cured for 24 hours at a temperature of 23° C. and a relative humidity of 50%. The sheet was then evaluated for its physical properties.

Comparative Example 2

A sheet having a thickness of 2 mm was produced by using the composition 1-2, and the sheet was cured for 24 hours at a temperature of 23° C. and a relative humidity of 50%. The sheet was then evaluated for its physical properties.

The results are shown in Table 1.

TABLE 1

|  | Example 1 Composition 1-1/ Composition 1-2 | Comparative Example 1 Composition 1-1 | Comparative Example 2 Composition 1-2 |
|---|---|---|---|
| Hardness (duro A) | 10 | Not measurable | Not measurable |
| Elongation (%) | 250 |  |  |
| Tensile strength (MPa) | 0.5 |  |  |

Example 2

As the first part composition, 50 parts by weight of dimethylpolysiloxane terminated at both ends with hydroxy group and having a viscosity of 20,000 mPa·s, 20 parts by weight of dimethylpolysiloxane terminated at both ends with trimethylsiloxy group having a viscosity of 100 mPa·s, and 5 parts by weight of Aerosil R972 (a fumed silica manufactured by Nippon Aerosil) were mixed until the mixture was homogeneous. Next, 2.5 parts by weight of vinyltriisopropenoxysilane, 0.5 parts by weight of tetramethylguanidylpropyltrimethoxysilane, 0.5 parts by weight of γ-aminopropyltriethoxysilane, and 1.5 parts by weight cyclohexanone were mixed until the mixture was homogeneous. Composition 2-1 was thereby produced.

As the second part composition, 50 parts by weight of dimethylpolysiloxane terminated at both ends with hydroxy group and having a viscosity of 20,000 mPa·s, 20 parts by weight of dimethylpolysiloxane terminated at both ends with trimethylsiloxy group having a viscosity of 100 mPa·s, and 5 parts by weight of Aerosil R972 (a fumed silica manufactured by Nippon Aerosil) were mixed until the mixture was homogeneous. Next, 2.5 parts by weight of methyl-tri-n-butylaminosilane and 0.05 parts by weight of dioctyltindilaurate were mixed until the mixture was homogeneous. Composition 2-2 was thereby produced.

All of the composition 2-1 and all of the composition 2-2 were charged a duplex cartridge of a 12-stage static mixer, and the mixture was injected from a purposely built gun into a glass dish having a depth of 15 mm until the dish was full. The composition was allowed to cure for 24 hours at a temperature of 23° C. and a relative humidity of 50%. The thickness of the cured film (thickness of the cured part) was then confirmed.

In the meanwhile, 0.2 g of the composition 2-1 was coated on a glass plate and 0.2 g of the composition 2-2 was coated on another glass plate, and the glass plates were adhered. After curing at a temperature of 23° C. and a relative humidity of 50% for 4 hours, the glass plates were separated to confirm the curing in the interior of the composition.

Comparative Example 3

The composition 2-1 was injected into a glass dish having a depth of 15 mm until the dish was full, and the composition was allowed to cure for 24 hours at a temperature of 23° C. and a relative humidity of 50%. The thickness of the cured film was then confirmed.

In the meanwhile, 0.2 g of the composition 2-1 was coated on a glass plate and 0.2 g of the composition 2-1 was also coated on another glass plate, and the glass plates were adhered. After curing at a temperature of 23° C. and a relative humidity of 50% for 4 hours, the glass plates were separated to confirm the curing in the interior of the composition.

Comparative Example 4

The composition 2-2 was injected into a glass dish having a depth of 15 mm until the dish was full, and the composition was allowed to cure for 24 hours at a temperature of 23° C. and a relative humidity of 50%. The thickness of the cured film was then confirmed.

In the meanwhile, 0.2 g of the composition 2-2 was coated on a glass plate and 0.2 g of the composition 2-2 was also coated on another glass plate, and glass plates were adhered. After curing at a temperature of 23° C. and a relative humidity of 50% for 4 hours, the glass plates were separated to confirm the curing in the interior of the composition.

The results are shown in Table 2.

TABLE 2

|  | Example 2 Composition 2-1/ Composition 2-2 | Comparative Example 3 Composition 2-1 | Comparative Example 4 Composition 2-2 |
|---|---|---|---|
| Thickness after coating (mm) | 15 | 1.9 | 1.8 |
| Curability | Cured to the interior | The interior remained uncured | The interior remained uncured |

Example 3

As the first part composition, 50 parts by weight of dimethylpolysiloxane terminated at both ends with hydroxy group having a viscosity of 20,000 mPa·s, and 50 parts by weight of Crystallite VXS-2 (pulverized silica manufactured by Tatsumori) were mixed until the mixture was homogeneous. Next, 4.0 parts by weight phenyltriisopropenoxysilane, 0.5 parts by weight of tetramethylguanidine, and 0.5 parts by weight of γ-aminopropyltriethoxysilane were mixed until the mixture was homogeneous. Composition 3-1 was thereby produced.

As the second part composition, 50 parts by weight of dimethylpolysiloxane terminated at both ends with hydroxy group having a viscosity of 20,000 mPa·s, and 50 parts by weight of Crystallite VXS-2 (pulverized silica manufactured by Tatsumori) were mixed until the mixture was homogeneous. Next, 4.0 parts by weight of methyl tri-n-butylaminosilane and 0.1 parts by weight of dibutyltinoctoate were mixed until the mixture was homogeneous. Composition 3-2 was thereby produced.

All of the composition 3-1 and all of the composition 3-2 were charged a duplex cartridge of a 12-stage static mixer, and the mixture was injected from a purposely built gun into a glass dish having a depth of 15 mm until the dish was full. The composition was allowed to cure for 24 hours at a temperature of 23° C. and a relative humidity of 50%. The thickness of the cured film (thickness of the cured part) was then confirmed.

Comparative Example 5

The composition 3-1 was injected into a glass dish having a depth of 15 mm until the dish was full, and the composition was allowed to cure for 24 hours at a temperature of 23° C. and a relative humidity of 50%. The thickness of the cured film was then confirmed.

Comparative Example 6

The composition 3-2 was injected into a glass dish having a depth of 15 mm until the dish was full, and the composition was allowed to cure for 24 hours at a temperature of 23° C. and a relative humidity of 50%. The thickness of the cured film was then confirmed.

The results are shown in Table 3.

TABLE 3

|  | Example 3<br>Composition 3-1/<br>Composition 3-2 | Comparative<br>Example 5<br>Composition 3-1 | Comparative<br>Example 6<br>Composition 3-2 |
|---|---|---|---|
| Thickness after coating (mm) | 6.1 | 1.7 | 1.8 |

Example 4

As the first part composition, 50 parts by weight of dimethylpolysiloxane terminated at both ends with hydroxy group and having a viscosity of 20,000 mPa·s and 50 parts by weight of MC Coat P20 (calcium carbonate manufactured by Maruo Calcium) were mixed until the mixture was homogeneous. Next, 4.0 parts by weight of vinyltriisopropenoxysilane, 0.5 parts by weight of tetramethylguanidine, and 0.5 parts by weight of γ-aminopropyltriethoxysilane were mixed until the mixture was homogeneous. Composition 4-1 was thereby produced.

As the second part composition, 50 parts by weight of dimethylpolysiloxane terminated at both ends with hydroxy group and having a viscosity of 20,000 mPa·s and 50 parts by weight of MC Coat P20 (calcium carbonate manufactured by Maruo Calcium) were mixed until the mixture was homogeneous. Next, 4.0 parts by weight of methyltricyclohexylaminosilane and 0.1 parts by weight of dimethyltindiversatate were mixed until the mixture was homogeneous. Composition 4-2 was thereby produced.

All of the composition 4-1 and all of the composition 4-2 were charged a duplex cartridge of a 12-stage static mixer, and the mixture was injected from a purposely built gun into a glass dish having a depth of 15 mm until the dish was full. The composition was allowed to cure for 24 hours at a temperature of 23° C. and a relative humidity of 50%. The thickness of the cured film (thickness of the cured part) was then confirmed.

Comparative Example 7

The composition 4-1 was injected into a glass dish having a depth of 15 mm until the dish was full, and the composition was allowed to cure for 24 hours at a temperature of 23° C. and a relative humidity of 50%. The thickness of the cured film was then confirmed.

Comparative Example 8

The composition 4-2 was injected into a glass dish having a depth of 15 mm until the dish was full, and the composition was allowed to cure for 24 hours at a temperature of 23° C. and a relative humidity of 50%. The thickness of the cured film was then confirmed.

The results are shown in Table 4.

TABLE 4

|  | Example 4<br>Composition 4-1/<br>Composition 4-2 | Comparative<br>Example 7<br>Composition 4-1 | Comparative<br>Example 8<br>Composition 4-2 |
|---|---|---|---|
| Thickness after coating (mm) | 5.8 | 1.4 | 1.4 |

Example 5

As the first part composition, 50 parts by weight of dimethylpolysiloxane terminated at both ends with hydroxy group and having a viscosity of 5,000 mPa·s, and 10 parts by weight of Aerosil R972 (a fumed silica manufactured by Nippon Aerosil) were mixed until the mixture was homogeneous. Next, 2.5 parts by weight of vinyltriisopropenoxysilane, and 0.5 parts by weight of tetramethylguanidylpropyltrimethoxysilane were mixed until the mixture was homogeneous. Composition 5-1 was thereby produced.

As the second part composition, 50 parts by weight of dimethylpolysiloxane terminated at both ends with hydroxy group and having a viscosity of 5,000 mPa·s, and 10 parts by weight of Aerosil R972 (a fumed silica manufactured by Nippon Aerosil) were mixed until the mixture was homogeneous. Next, 2.5 parts by weight of methyltriethylaminosilane and 0.1 part by weight of dioctyltindilaurate were mixed until the mixture was homogeneous. Composition 5-2A was thereby produced.

All of the composition 5-1 and all of the composition 5-2A were charged a duplex cartridge of a 12-stage static mixer, and the mixture was injected from a purposely built gun into a glass dish having a depth of 15 mm until the dish was full. The composition was allowed to cure for 24 hours at a temperature of 23° C. and a relative humidity of 50%. The thickness of the cured film (thickness of the cured part) was then confirmed.

Comparative Example 9

Example 5 was repeated except that 2.5 parts by weight of methyltrisdiethylaminosilane was used instead of 2.5 parts by weight of methyltriethylaminosilane to prepare composition 5-2B instead of composition 5-2A.

All of the composition 5-1 and all of the composition 5-2B were charged a duplex cartridge of a 12-stage static mixer, and the mixture was injected from a purposely built gun into a glass dish having a depth of 15 mm until the dish was full. The composition was allowed to cure for 24 hours at a temperature of 23° C. and a relative humidity of 50%. The thickness of the cured film (thickness of the cured part) was then confirmed.

The results are shown in Table 5.

TABLE 5

|  | Example 5 Composition 5-1/ Composition 5-2A | Comparative Example 9 Composition 5-1/ Composition 5-2B |
|---|---|---|
| Thickness after coating (mm) | 15 | 2.0 |

Japanese Patent Application No. 2007-104478 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature fast-curing organopolysiloxane composition consisting of a first part composition and a second part composition, said first part composition comprising (A) 10 to 90 parts by weight of a diorganopolysiloxane having both ends terminated with a hydroxy group and/or a hydrolyzable group, (B) 0.5 to 10 parts by weight of a silane and/or a siloxane having at least 3 alkenoxy silyl groups in its molecule, and (D) 0.01 to 10 parts by weight of a curing catalyst selected from the group consisting of guanidine, 1,8-diazabicyclo[5.4.0]-7-undecene and an alkoxysilane having a guanidyl group, and said second part composition comprising (A) 10 to 90 parts by weight of a diorganopolysiloxane having both ends terminated with a hydroxy group and/or a hydrolyzable group, (C) 0.5 to 10 parts by weight of a silane and/or a siloxane having at least 3 aminosilyl groups in its molecule being capable of forming a compound having —NH2 groups by hydrolysis, and (D) 0 to 9.99 parts by weight of a tin catalyst, with the proviso that the total amount of component (A) contained in the first and second part compositions is 100 parts by weight and the total amount of component (D) contained in the first and second part compositions is 0.01 to 10 parts by weight, wherein the component (B) is an alkenoxysilane represented by the following formula:

$$R^1{}_x\text{-Si}(O\text{—}CR^2\text{=}CR^3R^4)_{4-x}$$

wherein $R^1$ and $R^2$ are independently methyl group, ethyl group, vinyl group or phenyl group; $R^3$ and $R^4$ are independently a hydrogen atom, methyl group or ethyl group, or $R^2$ and $R^3$ may bond together to form —CH$_2$)$_4$— group with the proviso that $R^4$ is a hydrogen atom; and x is 0 or 1; or its partial hydrolyzate, and the component (C) is the aminosilane represented by the following formula:

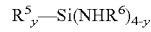

$$R^5{}_y\text{—Si}(NHR^6)_{4-y}$$

wherein $R^5$ is methyl group, ethyl group, vinyl group or phenyl group, $R^6$ is ethyl group, propyl group, butyl group, pentyl group or cyclohexyl group, and y is 0 or 1.

2. The room temperature fast-curing organopolysiloxane composition according to claim 1 wherein (E) a silane coupling agent is incorporated in the first part composition and/or the second part composition in an amount of 0.1 to 10 parts by weight per 100 parts by weight of the total amount of components (A) in the first and second part compositions.

3. The room temperature fast-curing organopolysiloxane composition according to claim 1 wherein (F) a filler is incorporated in the first part composition and/or the second part composition in an amount of 1 to 500 parts by weight per 100 parts by weight of the total amount of components (A) in the first and second part compositions.

4. The room temperature fast-curing organopolysiloxane composition according to claim 1 wherein the weight ratio of the first part composition and the second part composition is in the range of 25:75 to 75:25 in the room temperature fast curing organopolysiloxane composition.

* * * * *